United States Patent
Hrovat et al.

(10) Patent No.: US 6,941,205 B2
(45) Date of Patent: Sep. 6, 2005

(54) SYSTEM AND METHOD FOR DETECHING ROLL RATE SENSOR FAULT

(75) Inventors: Davorin David Hrovat, Ann Arbor, MI (US); Hongtei Eric Tseng, Canton, MI (US); Li Xu, Belleville, MI (US)

(73) Assignee: Ford Global Technologies, LLC., Dearborn, MI (US)

(*) Notice: Subject to any disclaimer, the term of this patent is extended or adjusted under 35 U.S.C. 154(b) by 77 days.

(21) Appl. No.: 10/620,881

(22) Filed: Jul. 16, 2003

(65) Prior Publication Data

US 2004/0059480 A1 Mar. 25, 2004

Related U.S. Application Data

(60) Provisional application No. 60/400,155, filed on Aug. 1, 2002.

(51) Int. Cl.[7] .............................. B60R 21/32; B60Q 1/00
(52) U.S. Cl. .............................. 701/34; 701/38; 701/45; 701/70; 701/72; 701/75; 280/755; 303/146
(58) Field of Search .............................. 701/34, 38, 45, 701/70, 72, 75; 180/197; 280/755; 303/146

(56) References Cited

U.S. PATENT DOCUMENTS

| | | | |
|---|---|---|---|
| 2,917,126 A | 12/1959 | Phillips | |
| 3,604,273 A | 9/1971 | Kwok et al. | |
| 3,608,925 A | 9/1971 | Murphy | |
| 3,899,028 A | 8/1975 | Morris et al. | |
| 3,948,567 A | 4/1976 | Kasselmann et al. | |
| 3,972,543 A | 8/1976 | Presley et al. | |
| 4,023,864 A | 5/1977 | Lang et al. | |
| RE30,550 E | 3/1981 | Reise | |
| 4,480,714 A | 11/1984 | Yabuta et al. | |
| 4,592,565 A | 6/1986 | Eagle | |

(Continued)

FOREIGN PATENT DOCUMENTS

| | | |
|---|---|---|
| DE | 36 16 907 | 11/1987 |
| DE | 38 15 938 | 11/1989 |
| DE | 43 21 571 | 1/1994 |
| DE | 42 27 886 | 2/1994 |
| DE | 43 35 979 | 4/1995 |
| DE | 43 42 732 | 6/1995 |
| DE | 199 07 633 | 10/1999 |
| EP | 0 430 813 | 12/1993 |
| EP | 0 662 601 | 7/1995 |
| EP | 0 758 601 | 2/1997 |

(Continued)

OTHER PUBLICATIONS

A method for reducing on-road rollovers—anti-rollover braking, Thomas J. Wielenga, Dynamotive, LLC, International Congress and Exposition, Detroit, Michigan, Mar. 1-4, 1999.

(Continued)

*Primary Examiner*—Michael J. Zanelli
*Assistant Examiner*—Eric M. Gibson
(74) *Attorney, Agent, or Firm*—Gary Smith

(57) ABSTRACT

A control system for an automotive vehicle having a vehicle body includes a sensor cluster having a housing oriented within the vehicle body. A roll rate sensor is positioned within the housing and generates a roll rate sensor signal corresponding to a roll angular motion of the sensor housing. A controller receives the roll rate sensor signal and generates a reference roll angle. The controller also compares the reference roll angle to the roll rate sensor signal and generates a roll rate sensor fault signal in response a fault determined in said roll rate sensor.

26 Claims, 2 Drawing Sheets

U.S. PATENT DOCUMENTS

| | | |
|---|---|---|
| 4,597,462 A | 7/1986 | Sano et al. |
| 4,650,212 A | 3/1987 | Yoshimura |
| 4,679,808 A | 7/1987 | Ito et al. |
| 4,690,553 A | 9/1987 | Fukamizu et al. |
| 4,761,022 A | 8/1988 | Ohashi |
| 4,765,649 A | 8/1988 | Ikemoto et al. |
| 4,767,588 A | 8/1988 | Ito |
| 4,778,773 A | 10/1988 | Sukegawa |
| 4,809,183 A | 2/1989 | Eckert |
| 4,827,416 A | 5/1989 | Kawagoe et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,163,319 A | 11/1992 | Spies et al. |
| 5,200,896 A | 4/1993 | Sato et al. |
| 5,208,749 A | 5/1993 | Adachi et al. |
| 5,224,765 A | 7/1993 | Matsuda |
| 5,228,757 A | 7/1993 | Ito et al. |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,278,761 A | 1/1994 | Ander et al. |
| 5,282,134 A | 1/1994 | Gioutsos et al. |
| 5,311,431 A | 5/1994 | Cao et al. |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,446,658 A | 8/1995 | Pastor et al. |
| 5,510,989 A | 4/1996 | Zabler et al. |
| 5,548,536 A | 8/1996 | Ammon |
| 5,549,328 A | 8/1996 | Cubalchini |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,742,918 A | 4/1998 | Ashrafi et al. |
| 5,742,919 A | 4/1998 | Ashrafi et al. |
| 5,762,406 A | 6/1998 | Yasui et al. |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,842,143 A | 11/1998 | Lohrenz et al. |
| 5,857,535 A | 1/1999 | Brooks |
| 5,869,943 A | 2/1999 | Nakashima et al. |
| 5,878,357 A | 3/1999 | Sivashankar et al. |
| 5,893,896 A | 4/1999 | Imamura et al. |
| 5,925,083 A | 7/1999 | Ackermann |
| 5,931,546 A | 8/1999 | Nakashima et al. |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,971,503 A | 10/1999 | Joyce et al. |
| 6,002,974 A | 12/1999 | Schiffman |
| 6,002,975 A | 12/1999 | Schiffman et al. |
| 6,026,926 A | 2/2000 | Noro et al. |
| 6,038,495 A | 3/2000 | Schiffmann |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,122,568 A | 9/2000 | Madau et al. |
| 6,122,584 A | 9/2000 | Lin et al. |
| 6,129,172 A | 10/2000 | Yoshida |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,169,939 B1 | 1/2001 | Raad et al. |
| 6,176,555 B1 | 1/2001 | Semsey |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafti et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,227,482 B1 | 5/2001 | Yamamoto |
| 6,233,510 B1 | 5/2001 | Platner et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,292,734 B1 | 9/2001 | Murakami et al. |
| 6,292,759 B1 | 9/2001 | Schiffmann |

| Patent No. | Date | Inventor |
|---|---|---|
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B2 | 1/2002 | Brown et al. |
| 6,349,247 B1 | 2/2002 | Schramm et al. |
| 6,351,694 B1 | 2/2002 | Tseng et al. |
| 6,352,318 B1 | 3/2002 | Hosomi et al. |
| 6,356,188 B1 | 3/2002 | Meyers et al. |
| 6,370,938 B1 | 4/2002 | Leimbach et al. |
| 6,394,240 B1 | 5/2002 | Barwick |
| 6,397,127 B1 | 5/2002 | Meyers et al. |
| 6,419,240 B1 | 7/2002 | Burdock et al. |
| 6,428,118 B1 | 8/2002 | Blosch |
| 6,438,464 B1 | 8/2002 | Woywod et al. |
| 6,456,905 B2 | 9/2002 | Katz et al. |
| 6,477,480 B1 | 11/2002 | Tseng et al. |
| 6,496,758 B2 | 12/2002 | Rhode et al. |
| 6,496,763 B2 | 12/2002 | Griessbach |
| 6,498,976 B1 | 12/2002 | Ehlbeck et al. |
| 6,542,792 B2 | 4/2003 | Schubert et al. |
| 6,547,022 B2 | 4/2003 | Hosomi et al. |
| 6,554,293 B1 | 4/2003 | Fennel et al. |
| 6,556,908 B1 | 4/2003 | Lu et al. |
| 6,559,634 B2 | 5/2003 | Yamada |
| 6,600,985 B2 | 7/2003 | Weaver |
| 2002/0014799 A1 | 2/2002 | Nagae |
| 2002/0040268 A1 | 4/2002 | Yamada et al. |
| 2002/0056582 A1 | 5/2002 | Chubb |
| 2002/0065591 A1 | 5/2002 | Schubert et al. |
| 2002/0075139 A1 | 6/2002 | Yamamoto et al. |
| 2002/0087235 A1 | 7/2002 | Aga et al. |
| 2002/0095244 A1 | 7/2002 | Rhode et al. |
| 2002/0096003 A1 | 7/2002 | Yamada et al. |
| 2002/0128795 A1 | 9/2002 | Schiffmann |
| 2002/0139599 A1 | 10/2002 | Lu |
| 2002/0163437 A1 | 11/2002 | Haas |
| 2002/0193916 A1 | 12/2002 | Katz et al. |
| 2003/0055549 A1 | 3/2003 | Barta et al. |

FOREIGN PATENT DOCUMENTS

| | | |
|---|---|---|
| EP | 1 006 026 A2 | 6/2000 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |
| JP | 9005352 | 1/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| SU | 816849 | 3/1981 |

OTHER PUBLICATIONS

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", $12^{th}$ International Conference on Experimental Safety Vehicles, Goteborg, Sweden, May 29–Jun. 1, 1989.

Niii, N., Nishijima, Y., Nakagaw, K., "rollover analysis method of a large–size bus", JSAE 9540020, 1995.

Eger, R., Kiencke, U., "Modeling of rollover sequences", Control Engineering Practice 11 (2003) 209–216.

US 6,941,205 B2

SYSTEM AND METHOD FOR DETECHING ROLL RATE SENSOR FAULT

RELATED APPLICATION

The present invention claims priority to provisional application No. 60/400,155 filed on Aug. 1, 2002, the disclosure of which is incorporated by reference herein.

TECHNICAL FIELD

The present invention relates generally to automotive vehicle sensors, and more specifically, to a method and apparatus for detecting a roll rate sensor fault.

BACKGROUND

Current, rollover stability control (RSC) schemes address vehicle roll and include a variety of sensors sensing vehicle dynamic conditions. RSC systems further include a controller controlling a distributed brake pressure for reducing a tire moment such that the net moment of the vehicle is counter to the vehicle roll direction.

The RSC sensors include a speed sensor, a lateral acceleration sensor, a roll rate sensor, and a yaw rate sensor. The roll rate sensor is typically utilized to estimate the roll angle and to calculate the desired control pressure. Fault modes of the roll rate sensor, therefore, may cause unintended braking, reduced performance or even loss of stability. Such fault modes must be rapidly diagnosed and indicated so that the RSC system is shut down.

U.S. Pat. No. 6,315,373 addresses a similar issue of fault detection for a roll control device. It, however, merely addresses the detection of a lateral accelerometer in a system that uses lateral acceleration signals to detect vehicle roll over stability, which is insufficient for a comprehensive RSC system. Furthermore, this method relies heavily on the vehicle suspension model. Variations of the suspension parameters, such as the spring stiffness and damping ratio, may cause an unnecessary false warning (i.e. false positive) or a missed detection (i.e. false negative).

It is therefore desirable to provide a system that rapidly detects a roll rate sensor fault in a rollover stability control system that can be applied to various vehicle platforms without tuning. This method should also be able to detect a fault independent of the specific fault modes as well as detect a fault that is otherwise not detectable by checking electrical specifications.

SUMMARY OF THE INVENTION

In one aspect of the invention, a control system for an automotive vehicle having a vehicle body includes a sensor cluster having a housing oriented within the vehicle body. A roll rate sensor is positioned within the housing and generates a roll rate sensor signal corresponding to a roll angular motion of the sensor housing. A controller receives the roll rate sensor signal and generates a reference roll angle. The controller also compares the reference roll angle to the roll rate sensor signal and generates a roll rate sensor fault signal in response a fault determined in said roll rate sensor.

In a further aspect of the invention, a method for detecting a roll rate sensor fault includes generating a reference roll angle, generating a roll rate sensor signal, comparing the reference roll angle to the roll rate sensor signal, and generating a roll rate sensor fault signal.

One objective of the present invention is to provide a method for fault detection of a roll rate sensor onboard a vehicle. Sensor fault is not always detectable by sensor self test and/or system electronic monitoring, having detection relying on the fault to violate sensor specification. Because an in-range signal fault may occur, a redundancy check is included for a safety critical system. The proposed methodology is to provide such a redundancy check through software/analytical redundancy.

The present invention utilizes steering wheel angle, yaw rate, lateral acceleration, and vehicle speed signals to verify roll rate signal. Following the detection, the system, utilizing the roll rate signal may decide to directly shutdown, slowly shutdown, or use a different signal to operate in order to minimize negative effect.

The present invention utilizes both kinematics and dynamics relations among sensor signals and is robust to variation of suspension parameters and unavoidable biases in reference signals. It detects faults independent of the specific fault mode and detects faults that are otherwise not detectable.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
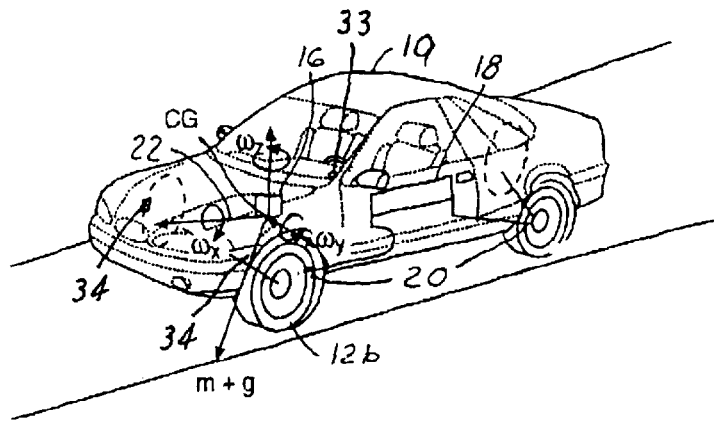
FIG. 1 is a diagrammatic view of a vehicle with variable vectors and coordinator frames in accordance with one embodiment of the present invention.

In the following figures the same reference numerals will be used to identify the same components. The present invention is preferably used to detect roll rate sensor fault in conjunction with a dynamic control system for an automotive vehicle, such as a yaw control system or a rollover control system. However, the present invention may also be used to detect roll rate sensor fault in any vehicle system including a roll rate sensor.

Figure 2:
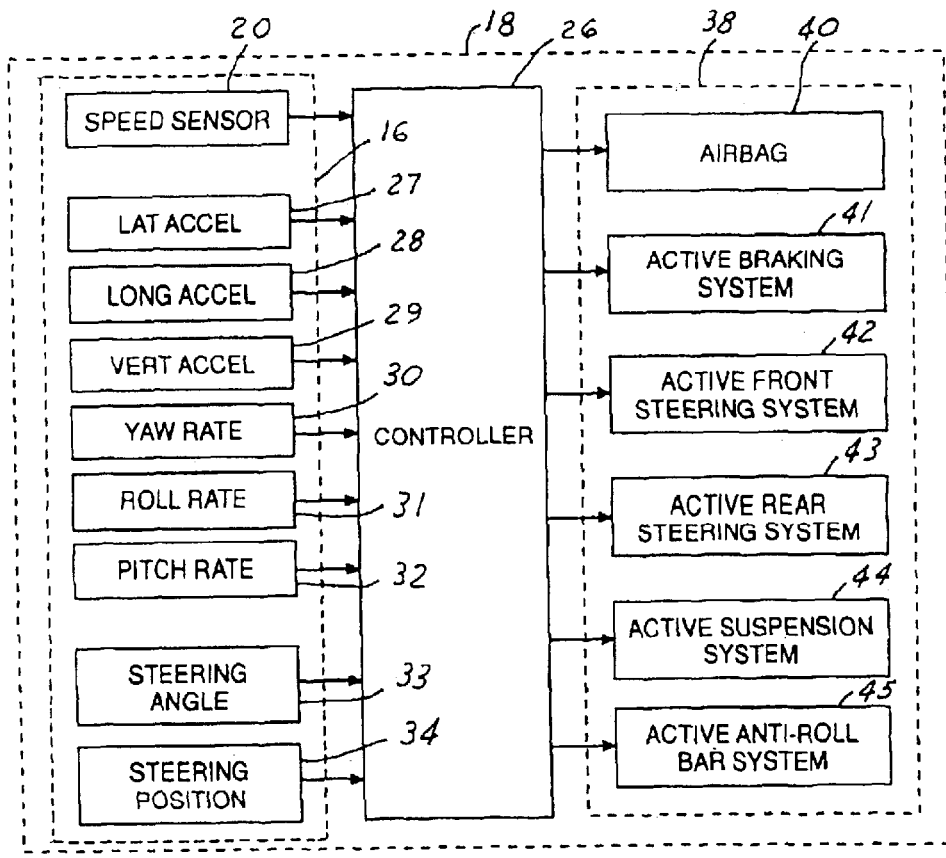
FIG. 2 is a block diagram of the vehicle sensor system from FIG. 1.

Referring to FIGS. 1 and 2, a safety system 18 for an automotive vehicle 19 having a sensing system 16 (sensing cluster), including a roll rate sensor 31, and a controller 26, is illustrated. Various forces and moments are acting thereon during a rollover condition.

The vehicle safety system 18 includes the sensor system 16. The sensing system 16 may use a six control sensor set including three axial accelerometers including a lateral accelerometer 27, a longitudinal accelerometer 28, and a vertical accelerometer 29 and three axial rotation rate detectors including a yaw rate sensor 30, a roll rate sensor 31, and a pitch rate sensor 32. The sensor system 16 further includes various other sensors, such as wheel speed sensors 20, a steering angle sensor 33 (hand-wheel sensor), and steering angle position sensors 34 (road-wheel sensors). The various sensors will be further described below.

The vehicle safety system 18 includes the roll rate sensor 31 positioned within the housing of the vehicle safety system 18. The roll rate sensor 31 generates a roll rate sensor signals corresponding to a roll angular motion of the sensor housing.

The vehicle safety system 18 also includes the controller 26. The controller 26 receives the roll rate sensor signals, generates a reference roll angle, and compares the reference roll angle to the roll rate sensor signal. The controller also generates a roll rate sensor fault signal in response to a fault determined in the roll rate sensor.

Based upon inputs from the sensor system 16, the controller 26 may control a safety device 38. Depending on the desired sensitivity of the system and various other factors, not all the sensors is used in a commercial embodiment. The safety device 38 may control an airbag 40 or a steering actuator or braking actuator at one or more of the wheels of the vehicle. Also, other vehicle components such as a suspension control 48 are used to adjust the suspension to prevent rollover. Suspension control 48 may include an anti-roll bar.

Generally, the vehicle 19 has a weight represented as Mg at the center of gravity of the vehicle 19, where g=9.8 m/s$^2$ and M is the total mass of the vehicle 19.

The reference roll angle, a vehicle roll angle in the inertial frame (or the angle between vehicle body lateral axis and the horizon), is obtained with available signals other than roll rate, which is the signal to be verified. This roll angle is an independent reference (from roll rate) of vehicle (global) roll angle, and is therefore termed the "reference roll angle".

In one embodiment of the present invention, the reference roll angle is generated within the controller 26 through the kinematics relationship between lateral acceleration, yaw rate, vehicle longitudinal speed, and vehicle roll angle are utilized. In other words, $$\sin\hat{\phi}=(u\cdot r-a_y)/g,$$

where $\phi$ is roll angle, u is vehicle speed, r is yaw rate, g is gravity constant and $a_y$ is lateral acceleration.

The reference roll angle is generated by applying steering wheel angle information to reduce the approximation error due to the negligence of the dynamic lateral velocity derivative in the above equation. Another embodiment of the present invention includes generating a reference roll angle using steering wheel angle from the steering angle sensor 33 or steering position sensor 34, yaw rate from the yaw rate sensor 30, lateral acceleration from the lateral acceleration sensor 27, and vehicle longitudinal speed from the speed sensor 20.

Alternately, the dynamic relation between lateral acceleration experienced by the vehicle body and suspension roll motion is used to generate the reference roll angle. The equation representation thereof is:

$$\frac{d}{dt}\begin{bmatrix}\varphi\\ \dot{\varphi}\end{bmatrix}=\begin{bmatrix}0 & 1\\ -K & -C\end{bmatrix}\begin{bmatrix}\varphi\\ \dot{\varphi}\end{bmatrix}+\begin{bmatrix}0\\ M/I*H\end{bmatrix}a_y.$$

After obtaining the reference roll angle, the roll rate signal is compensated within the controller 26 for all 'valid' signal biases.

A 'valid' signal bias refers to a bias that may occur due to either an electrical noise within sensor specification and/or due to a mechanical disturbance from maneuvers/road conditions.

For example, a vehicle pitch angle during a turn will induce a measurement bias due to the difference between inertial frame and rotational frame. To illustrate:

$$\dot{\phi}=\omega_x+\sin\phi\cdot\tan\theta\cdot\omega_y+\cos\phi\cdot\tan\theta\cdot\omega_z$$

where $\dot{\phi}$ is Euler roll rate (inertial frame), $\omega_x$, $\omega_y$, and $\omega_z$ are the rotational rate of the body-fixed coordinate. That is, $\omega_x$ is the roll rate sensor measurement, $\omega_z$ is the yaw rate sensor measurement, and $\phi$ is the roll angle of interest. Since vehicle roll angle is generally small, the system 18 is concerned with only the third term (of the right hand side) which is a product of vehicle yaw rate and vehicle pitch angle. That is, $$\dot{\phi}\approx\omega_x+\tan\theta\cdot\omega_z$$

(Important to note is that when a roll rate fault does occur during a turning maneuver, the compensation mechanism may attempt to compensate the biased roll rate signal by adapting the pitch angle in the above equation.)

The vehicle roll rate signal averages to zero over a long period of time, therefore, electrical long term bias over time with a minute adjustment at each sampling time.

Similarly, the mechanical, long-term sensor alignment pitch angle is controlled with a minute adjustment at each sampling time during vehicle turning (i.e. $\omega_z\neq 0$) Because chattering is warranted with this approach, the adjustment should be small enough to prevent the chattering magnitude from exceeding the desired accuracy. The small adjustment restricts the adaptation speed. One skilled in the art will realize that the minute adjustment is only one possible embodiment of adjustment, and that numerous other methods are included in the present invention. Other adjustments, such as sliding mode control based on the basic logic/assumption described above, can be applied.

Figure 3:
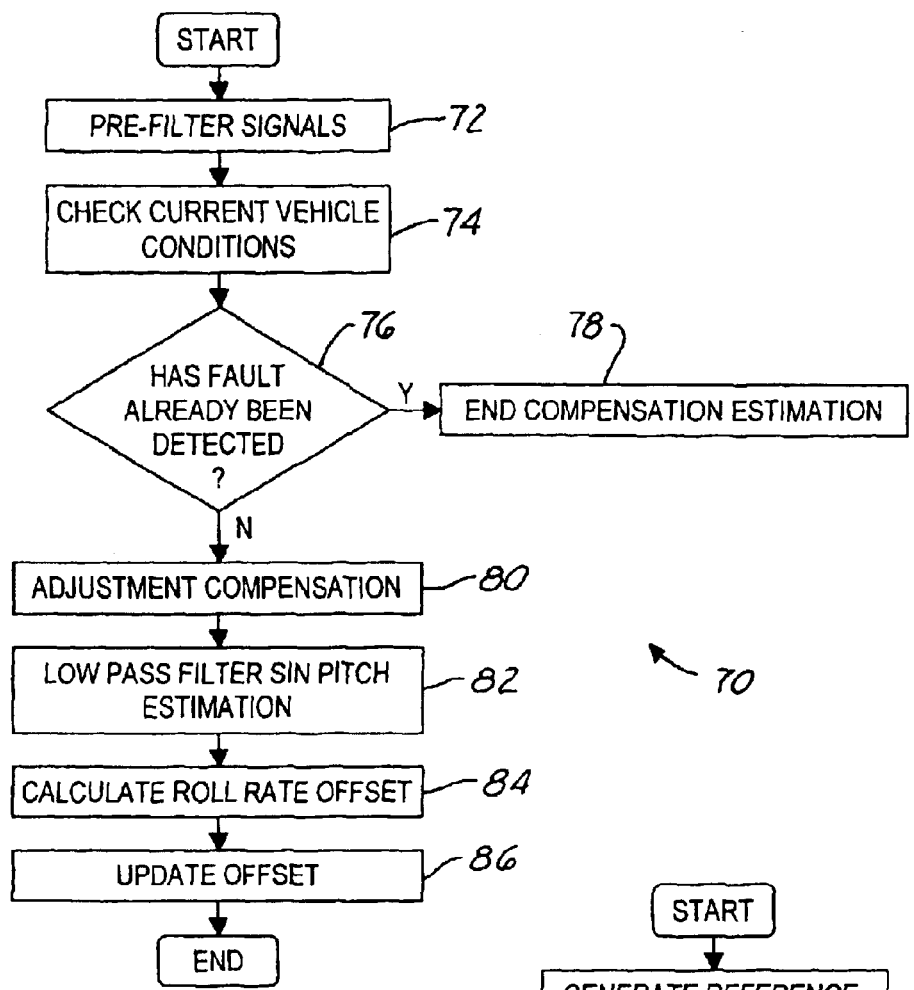
FIG. 3 is a logic flow diagram of a method for signal compensation of the roll rate signal for all 'valid' biases in accordance with another embodiment of the present invention.

Referring to FIG. 3, a logic flow diagram 70 of signal compensation of the roll rate signal for all 'valid' biases is illustrated. Logic starts in operation block 72 where the signals to be processed are pre-filtering (e.g. with a low pass filter).

In operation block 74, current vehicle conditions are checked. In other words, a determination is made whether the yaw rate signal is of significant magnitude such that the signal to noise ratio in the subsequent calculation is meaningful and if current vehicle condition is appropriate to assume zero roll rate.

In inquiry block 76, a check is made whether a fault has already been detected. For a positive response, in operation block 78, roll rate compensation/pitch alignment estimation is stopped if a fault flag is set or is suspected to prevent unneeded and unwanted compensation.

Otherwise, in operation block 80, a compensation for electrical bias occurs with minute adjustments through logic, such as:

rollrate_compensated=rawrollrate-offset_straight-(yawrate*RAD2DEG)*spa_est;

spa_est-=p_SPA_DELTA*(sign(rollrate_compensated*yawrate));

spa_est=min(MAX_SPA,max(MIN_SPA,spa_est)), where spa_est is the sine of the pitch angle.

In operation block 82, the sine pitch estimation is low pass filtered to minimize undesirable chattering noises, through logic such as:

lpf_spa=k*lpf_spa+(1−k)*spa_est.

In operation block 84, the total roll rate offset due to both electrical bias (offset_straight) and mechanical bias (lpf_spa and yawrate). is calculated through logic, such as:

offset_dynamic=offset_straight+(yawrate*RAD2 DEG)*(lpf_spa).

In operation block 86, the offset straight is updated during straight line driving (i.e. when the turning condition of operation block 74 is not met) through logic as follows:

rollrate_compensated=rawrollrate−offset_straight;

offset_straight+=p_RR_DELTA*(sign(rollrate_compensated)).

Referring again to FIGS. 1 and 2, the compensated roll rate signal is compared, within the controller 26, with the reference roll angle through kinematics relation and the dynamic interaction related by vehicle suspension. During the comparison, a fault is not declared under a plausible bias due to imperfect compensation (of electrical/mechanical disturbances) nor when the accuracy of reference vehicle roll angle is in question.

The controller 26 compares a high pass filtered reference roll angle to a high pass filtered version of the integration of the compensated roll rate signal. When the two differ and the latter signal is nonzero, a fault is suspected.

The controller 26 compares a low pass filtered version of the derivative of the reference roll angle to the compensated roll rate signal. When the two differ and the roll rate is nonzero, a fault is suspected.

The controller 26 ideally includes a Kalman filter utilizing the suspension dynamic relation between roll angle acceleration, roll angle rate, and roll angle to compare the reference roll angle and the compensated roll rate.

The present invention designs an observer utilizing both the suspension dynamics and kinematics relationship between roll angle and rate. The present invention is robust to suspension parameters variations/uncertainties.

The present invention can be described as a mass-spring system, i.e.:

$$\dot{x} = \begin{bmatrix} 0 & 1 \\ -k & -c \end{bmatrix} x + \begin{bmatrix} 0 \\ 1 \end{bmatrix} d, \quad x = \begin{bmatrix} \phi \\ \dot{\phi} \end{bmatrix}, \text{ and } y = \begin{bmatrix} c_{11} & c_{12} \\ c_{21} & c_{22} \end{bmatrix} x + f,$$

where k is the (torsional) spring stiffness, or roll stiffness of the suspension, and c is the (roll) damping coefficient (of the suspension). Because the roll stiffness and damping of a vehicle maybe non-linear and may vary between vehicles and between configurations, these parameter uncertainties are lumped into another term in the aforementioned equation as d and are viewed as disturbances. Because the measurement can be defined as any linear combination of roll angle and roll rate, the C matrix in the equation above is left as design parameters.

$$\hat{y} = \begin{bmatrix} 1 & 1 \\ 0 & 1 \end{bmatrix} \hat{x},$$

Additionally, $$\dot{\hat{x}} = \begin{bmatrix} 0 & 1 \\ -k & -c \end{bmatrix} \hat{x} + \begin{bmatrix} 1 & 0 \\ 0 & 0 \end{bmatrix} (y - \hat{y}),$$

and residue=[1−1](y−ŷ), therefore, it can be shown that $TF_{d \to residue} = 0,$ $TF_{\text{roll\_angle\_err} \to residue} = \frac{s}{s+1},$ and $TF_{\text{roll\_rate\_err} \to residue} = -\frac{1}{s+1}.$ Defining the observer output as 'residue' causes a roll rate fault to appear as a residue in the observer output while a roll angle 'measurement' error appears as only a transient noise. Moreover, suspension characteristic changes, modeled as disturbance d, do not affect the observer output. Resultantly the same observer design can be applied to various vehicle platforms without tuning.

If the residue exceeds a pre-calibrated threshold, (which can be a pre-calibrated function of vehicle dynamic status,) a fault is suspected.

If a fault condition is indicated during the aforementioned comparison for a short period of time, having a pre-calibrated length, during which time the system did not detect any fault from the source signal that generated reference roll angle, then a roll rate sensor fault is concluded. Alternately, to facilitate a faster detection, a condition is added to check if roll rate signal is away from zero (which is the normal value) during this period.

Special fault detection: for sticky signal fault such that the roll rate signal sticks to a constant value, the following logic is developed:

If (abs(high pass filtered rollrate)<threshold_1) holds true for more than a precalibrated constant.
(abs(high pass filtered suspension roll angle (from lateral acceleration))>threshold_2) holds true for more than a precalibrated constant (not necessarily continuously),
then a fault is suspected. If this suspected situation has happened for more than a precalibrated number of times, set the fault flag.

Following detection of a roll rate sensor fault, the controller 26 responds by either shutting down the safety system 18 or any of the sub-systems of the safety system 18, such as roll-over control and compensation. Alternately, the controller 26 responds to roll rate sensor error by compensating for information that would normally be obtained from the roll rate sensor 31. In one embodiment, the controller 26 compensates for the roll rate sensor using signals from a combination sensors including, but not limited to: the lateral accelerometer 27, the longitudinal accelerometer 28, the vertical accelerometer 29, the yaw rate sensor 30, the pitch rate sensor 32, the wheel speed sensors 20, the steering angle sensor 33 (hand-wheel sensor), and steering angle position sensors 34 (road-wheel sensors). Regardless of the controller response to roll rate fault, a further embodiment of the present invention includes a driver notification of roll rate sensor problems.

Figure 4:
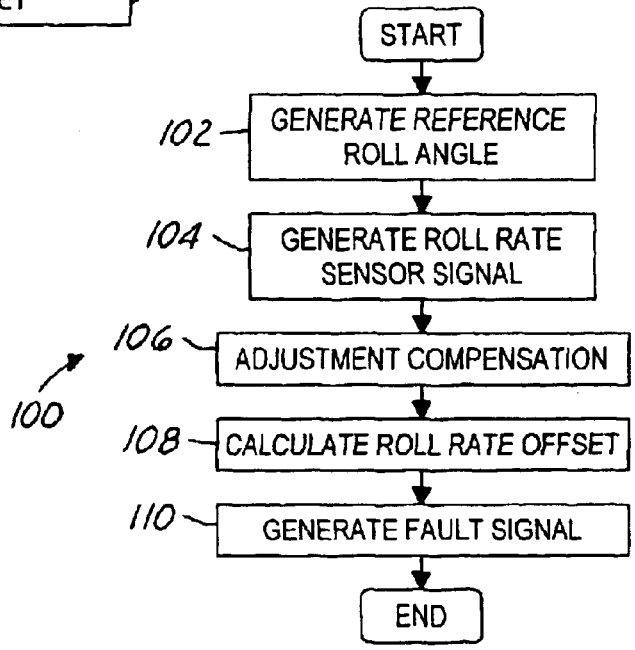
FIG. 4 is a logic flow diagram of a method for detecting a roll rate sensor fault in accordance with another embodiment of the present invention.

Referring now to FIG. 4, a logic flow diagram 100 of a method for detecting a roll rate sensor fault is illustrated. Logic starts in operation block 102, where a reference roll angle is generated from available signals other than the roll rate signal, as was discussed previously.

In operation block 104, a roll rate sensor signal is generated from the roll rate sensor.

In operation block 106, the reference roll angle is compared to the roll rate sensor signal. In operation block 108, a roll rate sensor fault signal is generated.

In operation, a method for detecting a roll rate sensor fault includes generating a reference roll angle in an inertial frame with available signals other than roll rate, generating a roll rate sensor signal, compensating the roll rate sensor signal for all valid signal biases, comparing the reference roll angle to the roll rate sensor signal through a kinematics relation and a dynamic interaction related by a vehicle suspension, and generating a roll rate sensor fault signal.

While particular embodiments of the invention have been shown and described, numerous variations and alternate embodiments will occur to those skilled in the art. Accordingly, it is intended that the invention be limited only in terms of the appended claims.

What is claimed is:

1. A method for detecting a roll rate sensor fault comprising: generating a reference roll angle; generating a roll rate sensor signal; comparing said reference roll angle to said roll rate sensor signal; and generating a roll rate sensor fault signal in response to comparing said reference roll angle to said roll rate sensor signal; and compensating for a valid signal bias in said roll rate sensor signal.

2. A method as recited in claim 1, wherein compensating for a valid signal bias further comprises adjusting an electrical long term bias over time with a minute adjustment at each sampling time or a sliding mode control.

3. A method as recited in claim 1, wherein compensating for a valid signal bias further comprises adjusting a mechanical long term sensor alignment pitch angle with a minute adjustment at each sampling time during vehicle turning or a sliding mode control during vehicle turning.

4. A method as recited in claim 1, wherein compensating for a valid signal bias further comprises halting roll rate sensor signal compensation in response to a fault flag or in response to a situation where compensation is unnecessary.

5. A method as recited in claim 1, wherein generating said reference roll angle further comprises sensing at least one of lateral acceleration, yaw rate, vehicle longitudinal speed, vehicle roll angle, wheel speed, or a GPS.

6. A method as recited in claim 1 further comprising refining said reference roll angle through steering wheel angle information to reduce a negligence error of a lateral velocity derivative.

7. A method as recited in claim 1 further comprising refining said reference roll angle with a calculation of a dynamic relation between a vehicle lateral acceleration and a suspension roll motion.

8. A method as recited in claim 1, wherein comparing said reference roll angle to said roll rate sensor signal comprises comparing a low pass filter version of a derivative of said reference roll angle with said roll rate sensor signal.

9. A method as recited in claim 1, wherein comparing said reference roll angle to said roll rate sensor signal comprises comparing a high pass filtered reference roll angle with a high pass filtered version of an integration of said roll rate sensor signal.

10. A method as recited in claim 1, wherein comparing said reference roll angle to said roll rate sensor signal comprises comparing said reference roll angle and said roll rate sensor signal through building a filter utilizing both a suspension dynamics and a kinematics relationship between roll angle and roll rate.

11. A method as recited in claim 1, wherein comparing said reference roll angle to said roll rate sensor signal comprises comparing said reference roll angle to said roll rate sensor signal through an observer that utilizes a kinematics relation and a dynamics relation.

12. A method as recited in claim 1, wherein comparing said reference roll angle to said roll rate sensor signal further comprises utilizing generating a dynamic bias estimate with a logic having said vehicle roll rate signal averaging to zero over a long period of time.

13. A method as recited in claim 1, wherein generating said roll rate sensor fault signal further comprises generating a lateral acceleration signal; filtering said lateral acceleration signal; generating a filtered lateral acceleration signal; high pass filtering said roll rate sensor signal; generating a filtered roll rate sensor signal; and comparing said filtered lateral acceleration signal to said filtered roll rate sensor signal.

14. A method as recited in claim 1 further comprising shutting down a safety system in response to roll rate sensor fault or error.

15. A method as recited in claim 1 further comprising generating a substitute signal for said roll rate signal in response to roll rate sensor fault.

16. A method for detecting a roll rate sensor fault comprising: generating a reference roll angle in an inertial frame with available signals other than roll rate; generating a roll rate sensor signal; compensating said roll rate sensor signal for all valid signal biases; comparing said reference roll angle to said roll rate sensor signal through a kinematics relation and a dynamic interaction related by a vehicle suspension; and generating a roll rate sensor fault signal comparing said reference roll angle to said roll rate sensor signal.

17. A method as recited in claim 16, wherein compensating for a valid signal bias further comprises halting roll rate sensor signal compensation in response to a fault flag or in response to a situation where compensation is unnecessary.

18. A method as recited in claim 16, wherein generating said roll rate sensor fault signal further comprises generating a lateral acceleration signal; filtering said lateral acceleration signal; generating a filtered lateral acceleration signal; high pass filtering said roll rate sensor signal; generating a filtered roll rate sensor signal; and comparing said filtered lateral acceleration signal to said filtered roll rate sensor signal.

19. A method as recited in claim 16 further comprising refining said reference roll angle with a calculation of a dynamic relation between a vehicle lateral acceleration and a suspension roll motion.

20. A control system for an automotive vehicle having a vehicle body comprising: a sensor cluster having a housing oriented within the vehicle body; a roll rate sensor positioned within the housing adapted to generate a roll rate sensor signal corresponding to an roll angular motion of the sensor housing; and a controller adapted to receive said roll rate sensor signal, said controller further adapted to generate a reference roll angle, and compare said reference roll angle to said roll rate sensor signal, said controller further adapted to generate a roll rate sensor fault signal in response to a fault determined in said roll rate sensor, wherein said controller is further adapted to compensate said roll rate sensor signal for all valid signal biases.

21. A system as recited in claim 20, wherein said controller is further adapted to refine said reference roll angle through steering wheel angle information.

22. A system as recited in claim 20, wherein said controller is further adapted to shut down a roll over detection system in response to said roll rate sensor fault signal.

23. A system as recited in claim 20, wherein said controller is further adapted to generate a substitute roll rate signal from sensor signals from at least one of a lateral accelerometer, a longitudinal accelerometer, a vertical accelerometer, a yaw rate sensor, a pitch rate sensor, a wheel speed sensor, a steering angle sensor, or a steering angle position sensor.

24. A method for detecting a vehicle-dynamic sensor fault comprising: generating a reference vehicle-dynamic sensor signal; generating a vehicle-dynamic sensor signal; and compensating for a valid signal bias in said vehicle-dynamic sensor signal by adjusting a mechanical long term sensor alignment angle with a minute adjustment at each sampling time during a vehicle operation.

25. The method of claim 24 further comprising comparing said reference vehicle-dynamic sensor signal to said vehicle-dynamic sensor signal.

26. The method of claim 25 further comprising generating a sensor fault signal.

* * * * *